(12) United States Patent
Luo (10) Patent No.: US 11,681,190 B2
(45) Date of Patent: Jun. 20, 2023

(54) ARRAY SUBSTRATE AND DISPLAY PANEL

(71) Applicant: TCL CHINA STAR OPTOELECTRONICS TECHNOLOGY CO., LTD., Shenzhen (CN)

(72) Inventor: Ping Luo, Shenzhen (CN)

(*) Notice: Subject to any disclaimer, the term of this patent is extended or adjusted under 35 U.S.C. 154(b) by 411 days.

(21) Appl. No.: 17/045,996

(22) PCT Filed: Aug. 5, 2020

(86) PCT No.: PCT/CN2020/107025
§ 371 (c)(1),
(2) Date: Oct. 8, 2020

(87) PCT Pub. No.: WO2021/212689
PCT Pub. Date: Oct. 28, 2021

(65) Prior Publication Data
US 2023/0058056 A1    Feb. 23, 2023

(30) Foreign Application Priority Data
Apr. 23, 2020    (CN) .......................... 202010328208.1

(51) Int. Cl.
*G02F 1/1362*    (2006.01)

(52) U.S. Cl.
CPC .. *G02F 1/136286* (2013.01); *G02F 1/136222* (2021.01)

(58) Field of Classification Search
CPC .................................................. G02F 1/1362
See application file for complete search history.

(56) References Cited

U.S. PATENT DOCUMENTS

| | | | | |
|---|---|---|---|---|
| 2004/0046901 A1* | 3/2004 | Matsuoka | ......... | G02F 1/133707 349/129 |
| 2006/0087603 A1* | 4/2006 | Lee | ......... | G02B 5/201 349/109 |
| 2013/0293809 A1* | 11/2013 | Kuroda | ......... | G02F 1/136286 257/773 |
| 2015/0087084 A1 | 3/2015 | Yuan | | |
| 2016/0013213 A1* | 1/2016 | Ishizaki | ......... | H01L 29/0847 257/71 |
| 2019/0302556 A1 | 10/2019 | Shin et al. | | |

FOREIGN PATENT DOCUMENTS

| | | |
|---|---|---|
| CN | 103487969 A | 1/2014 |
| CN | 106405968 A | 2/2017 |
| CN | 109240011 A | 1/2019 |
| CN | 110320714 A | 10/2019 |
| CN | 111443519 A | 7/2020 |
| KR | 20040036988 A | 5/2004 |
| TW | I235265 B | 7/2005 |

* cited by examiner

*Primary Examiner* — Sang V Nguyen (57) ABSTRACT

An array substrate and a display panel are provided. The array substrate includes a base substrate, a plurality of data lines, and a plurality of color resists. A bending unit is provided on the data line, so that an edge of a portion where the color resist covers the bending unit does not overlap with the data line, and thus is conducive for an external device to monitor an actual width of the portion where the color resist covers the bending unit.

19 Claims, 10 Drawing Sheets

ARRAY SUBSTRATE AND DISPLAY PANEL

FIELD OF INVENTION

The present invention relates to the field of display technologies, and in particular, to an array substrate and a display panel.

BACKGROUND OF INVENTION

In color filter on array (COA) liquid crystal products, after red/green/blue color resist strips are manufactured, they overlap with edges of data lines under the color resist strips. As a result, when measuring a width of each color resist strip, an actual line width cannot be measured.

In current technologies, the width of each color resist strip is monitored by setting up a testkey (test unit) at an end of each color resistive strip, and by monitoring a width of the testkey. However, the width of each color resist strip obtained by measuring the width of the testkey will be different from the actual width of each color resist strip, so it is impossible to accurately monitor the actual width of each color resistive strip.

Technical Problem

Embodiments of the present invention provide an array substrate and a display panel to solve a technical problem that current display panel measures width of each color resist by measuring a testkey, so that an actual width of each color resist strip cannot be accurately monitored.

Technical Solution

Embodiments of the present invention provide an array substrate, comprising:

a base substrate;

a plurality of data lines arranged on the base substrate at intervals, wherein each of the data lines comprises a bending unit, each bending unit comprises at least one bending portion, and the bending portion is formed by bending the data line around a side thereof; and a plurality of color resists disposed over the data lines, and each of the color resists is disposed between two adjacent data lines, wherein each color resist at least covers a portion of one of the at least one bending portions, and an edge of the portion of the bending portion where each color resist covers does not overlap with the bending portion.

In the array substrate described in the embodiments of the present invention, the plurality of color resists comprises a first color resist, a second color resist, and a third color resist disposed in sequence, a length of the first color resist is less than a length of the second color resist, and the length of the second color resist is less than a length of the third color resist.

In the array substrate described in the embodiments of the present invention, the bending unit comprises three bending portions and two connecting portions, the bending portions are arranged along an extending direction of the data line, and two adjacent bending portions are connected by one of the connecting portions;

the plurality of data lines comprises a first data line, a second data line, and a third data line arranged in sequence, the first color resist is disposed between the first data line and the second data line, the second color resist is disposed between the second data line and the third data line, and the third color resist is disposed on another side of the third data line; and the first color resist covers one bending portion of the first data line, the second color resist covers two bending portions of the second data line, and the third color resist covers three bending portions of the third data line.

In the array substrate described in the embodiments of the present invention, the bending unit comprises one of the bending portion, the plurality of data lines comprises a first data line, a second data line, and a third data line disposed in sequence, the first color resist is disposed between the first data line and the second data line, the second color resist is disposed between the second data line and the third data line, and the third color resist is disposed on another side of the third data line;

a portion of the bending portion of the first data line where the first color resist covers comprises a first length, a portion of the bending portion of the second data line where the second color resist covers comprises a second length, and a portion of the bending portion of the third data line where the third color resist covers comprises a third length; and the first length is less than the second length, and the second length is less than the third length.

In the array substrate described in the embodiments of the present invention, the bending unit comprises one bending portion, and each of the color resists completely covers the bending portion of the corresponding data line in one-to-one correspondence.

In the array substrate described in the embodiments of the present invention, the bending portion comprises a first section, a second section, and a third section, the first section and the third section are disposed in parallel, one end of the second section is connected to the first section, and another end of the second section is connected to the third section.

In the array substrate described in the embodiments of the present invention, the bending portion comprises a first section and a second section, the first section is connected to the second section, and an extending direction of the first section intersects with an extending direction of the second section.

In the array substrate described in the embodiments of the present invention, the bending portion is arc-shaped.

In the array substrate described in the embodiments of the present invention, the first color resist is a red color resist, the second color resist is a green color resist, and the third color resist is a blue color resist.

In the array substrate described in the embodiment of the present invention, each of the data lines further comprises an intermediate line section, and the intermediate line section is connected between two adjacent bending units.

The present invention further relates to a display panel comprising the above-mentioned array substrate. Specifically, the above array substrate comprises:

a base substrate;

a plurality of data lines arranged on the base substrate at intervals, wherein each of the data lines comprises a bending unit, each bending unit comprises at least one bending portion, and the bending portion is formed by bending the data line around a side thereof; and a plurality of color resists disposed over the data lines, and each color resist is disposed between two adjacent data lines, wherein each color resist at least covers a portion of one of the bending portions, and an edge of the portion of the bending portion where each color resist covers does not overlapping with the bending portion.

In the display panel described in the embodiments of the present invention, the plurality of color resists comprises a first color resist, a second color resist, and a third color resist disposed in sequence, a length of the first color resist is less than a length of the second color resist, and the length of the second color resist is less than a length of the third color resist.

In the display panel described in the embodiments of the present invention, the bending unit comprises three bending portions and two connecting portions, the bending portions are arranged along an extending direction of the data line, and two adjacent bending portions are connected by one of the connecting portions;

the plurality of data lines comprises a first data line, a second data line, and a third data line arranged in sequence, the first color resist is disposed between the first data line and the second data line, the second color resist is disposed between the second data line and the third data line, and the third color resist is disposed on another side of the third data line; and the first color resist covers one of the bending portions of the first data line, the second color resist covers two of the bending portions of the second data line, and the third color resist covers three of the bending portions of the third data line.

In the display panel described in the embodiments of the present invention, the bending unit comprises one of the bending portion, the plurality of data lines comprises a first data line, a second data line, and a third data line disposed in sequence, the first color resist is disposed between the first data line and the second data line, the second color resist is disposed between the second data line and the third data line, and the third color resist is disposed on another side of the third data line;

a portion of the bending portion of the first data line where the first color resist covers comprises a first length, a portion of the bending portion of the second data line where the second color resist covers comprises a second length, and a portion of the bending portion of the third data line where the third color resist covers comprises a third length; and the first length is less than the second length, and the second length is less than the third length.

In the display panel described in the embodiments of the present invention, the bending unit comprises one bending portion, and each of the color resists completely covers the bending portion of the corresponding data line in a one-to-one correspondence.

In the display panel described in the embodiments of the present invention, the bending portion comprises a first section, a second section, and a third section, the first section and the third section are disposed in parallel, one end of the second section is connected to the first section, and another end of the second section is connected to the third section.

In the display panel described in the embodiments of the present invention, the bending portion comprises a first section and a second section, the first section is connected to the second section, and an extending direction of the first section intersects with an extending direction of the second section.

In the display panel described in the embodiments of the present invention, the bending portion is arc-shaped.

In the display panel described in the embodiments of the present invention, the first color resist is a red color resist, the second color resist is a green color resist, and the third color resist is a blue color resist.

In the display panel described in the embodiments of the present invention, each of the data lines further comprises an intermediate line section, and the intermediate line section is connected between two adjacent bending units.

Beneficial Effect

An array substrate and a display panel of the present invention are provided with a bending unit on a data line, so that an edge of a portion where a color resist covers the bending unit does not overlap with the data line, and thus it is convenient for an external device to monitor an actual width of the portion of the color resist covering the bending unit.

Further, a plurality of color resists comprises a first color resist, a second color resist, and a third color resist disposed in sequence. In embodiments of the present invention, a length of the first color resist, a length of the second color resist, and a length of the third color resist are set to increase sequentially, so as to avoid an influence of the color resist adjacent to it when monitoring width of the color resist. It is convenient to monitor the width of each color resist more accurately.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The technical solution in the embodiments of the present invention will be clearly and completely described below with reference to the accompanying drawings in the embodiments of the present invention. It is to be understood that the described embodiments are merely exemplary of the invention, and not restrictive of the full scope of the invention. All other embodiments, which can be obtained by a person skilled in the art without inventive step based on the embodiments of the present invention, are within the scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

Figure 1:
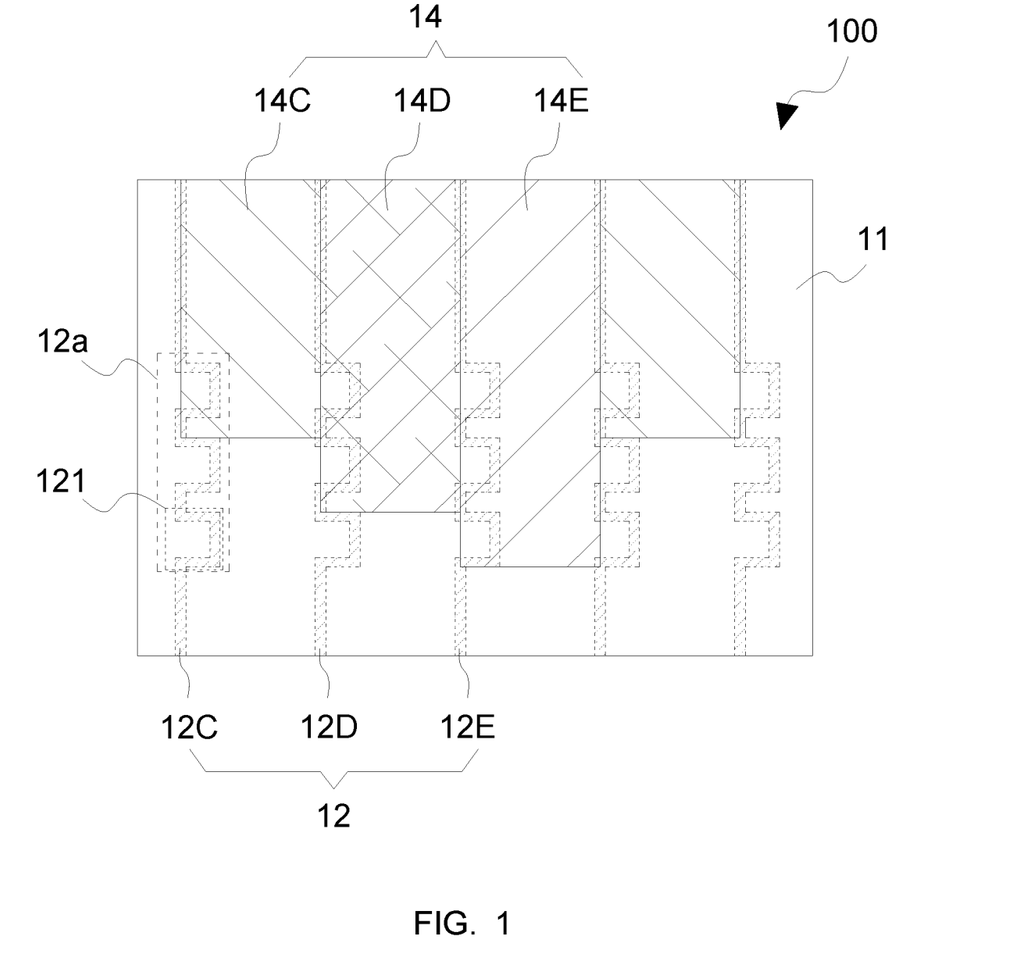
FIG. 1 is a schematic structural plan view of an array substrate of a first embodiment of the present invention.
Figure 2:
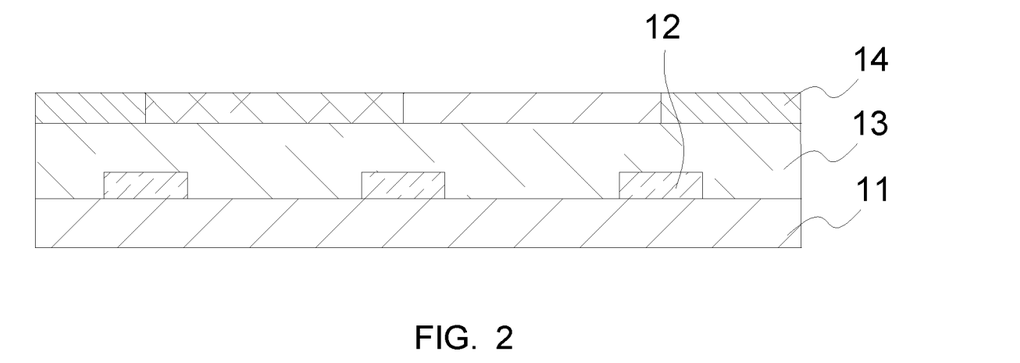
FIG. 2 is a schematic structural cross-sectional view of the array substrate of the first embodiment of the present invention.

Please refer to FIG. 1 and FIG. 2, FIG. 1 is a schematic plan view of an array substrate of a first embodiment of the present invention. FIG. 2 is a schematic cross-sectional view of the array substrate of the first embodiment of the present invention.

The first embodiment of the present invention provides an array substrate 100, which comprises a base substrate 11, a plurality of data lines 12, an intermediate structure layer 13, and a plurality of color resists 14.

Specifically, the base substrate 11 is a device substrate having a bottom plate, a barrier layer, a buffer layer, a semiconductor layer, a gate layer, and an insulating layer. The bottom plate may be a glass substrate or a flexible substrate.

The plurality of data lines 12 are arranged on the base substrate 11 at intervals. Each of the data lines 12 comprises a bending unit 12a. Each bending unit 12a comprises at least one bending portion 121, and the bending portion 121 is formed by bending the data line 12 around a side thereof.

The intermediate structure layer 13 is disposed on the data line 12. The intermediate structure layer 13 comprises an interlayer dielectric layer, a pixel electrode layer, and a protective layer. Since the intermediate structure layer 13 is the prior art, it will not be described here.

The color resists 14 are disposed over the data lines 12. Specifically, the color resists 14 are disposed on the intermediate structure layer 13. Each color resist 14 is disposed between two adjacent data lines 12. Each color resist 14 at least covers at least a portion of one bending portion 121, and an edge of the portion of the bending portion 121 where each color resist 14 covers does not overlap with the bending portion 121.

It should be noted that the color resist 14 disposed between the two adjacent data lines 12 is only a part of the color resist in the array substrate 100, because the color resist can also be disposed on one side of a certain data line, for example, a row of color resists at an edge. Therefore, as long as a color resist is disposed between two adjacent data lines, this is a safety boundary for the first embodiment of the present invention.

In addition, each data line 12 is provided with a plurality of the bending units 12a, one of the bending units 12a corresponds to one of the color resists 14 in order to monitor an actual width of each color resist 14.

In the array substrate 100 of the first embodiment of the present invention, the bending unit 12a is disposed on the data line 12 so that the edge of the portion where the color resist 14 covers the bending unit 12a does not overlap with the data line 12. An interference of the data line 12 on the edge of the color resist 14 is eliminated, so that it is convenient for an external device to monitor an actual width of the portion of the color resist 14 covering the bending unit 12a, thereby obtaining the actual width of the color resist 14.

In the array substrate 100 of the first embodiment of the present invention, the plurality of color resists 14 comprises a first color resist 14C, a second color resist 14D, and a third color resist 14E disposed in sequence. A length of the first color resist 14C is less than a length of the second color resist 14D, and the length of the second color resist 14D is less than a length of the third color resist 14E. Such an arrangement makes it possible to prevent adjacent color resists 14 from interfering when monitoring the width of a certain color resist 14, and to facilitate a more accurate monitoring of the width of each color resist 14.

Figure 3:
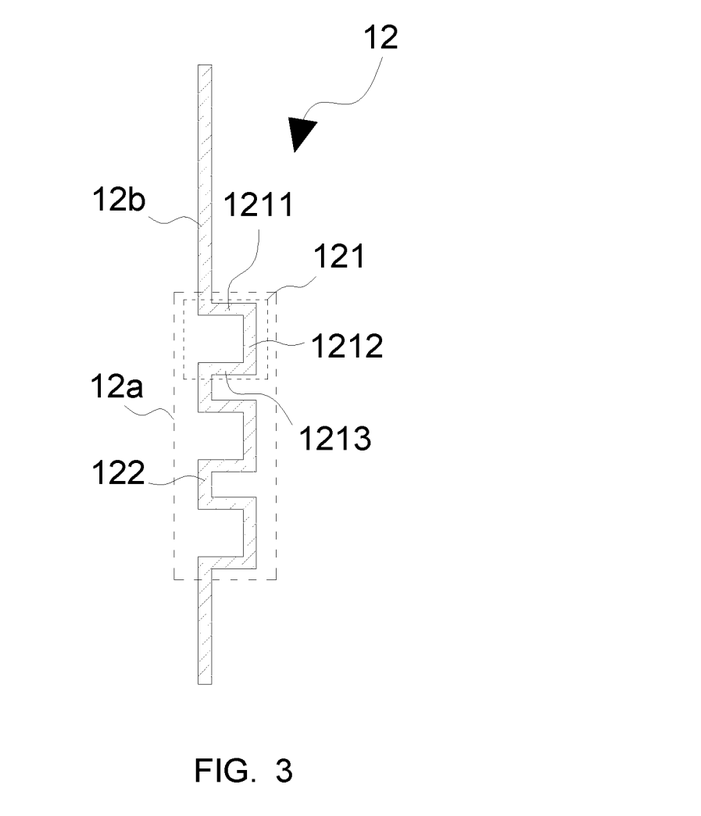
FIG. 3 is a schematic structural view of a data line of the array substrate according to the first embodiment of the invention.

Please refer to FIG. 3, each data line 12 further comprises an intermediate line section 12b, and the intermediate line section 12b is connected between two adjacent bending units 12a. The bending portion 121 comprises a first section 1211, a second section 1212, and a third section 1213. The first section 1211 and the third section 1213 are arranged in parallel, an end of the second section 1212 is connected to the first section 1211, and another end of the second section 1212 is connected to the third section 1213.

Optionally, an extending direction of the second section 1212 is perpendicular to an extending direction of the first section 1211. Of course, the extending direction of the second section 1212 may also obliquely cross the extending direction of the first section 1211.

An arrangement of the bending portion 121 prevents a partial edge of the color resist 14 from overlapping with the data line 12, so that the width of the color resist 14 is measured by monitoring the width of the portion of the color resist 14 that does not overlap with the data line 12.

Figure 4:
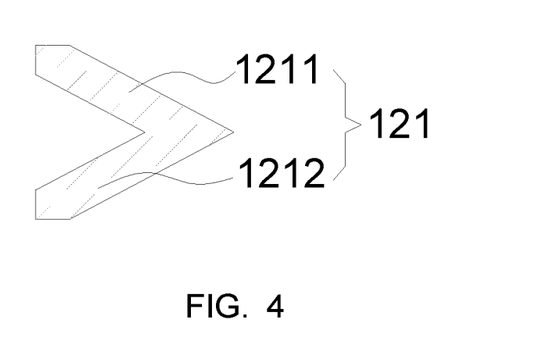
FIG. 4 is a schematic structural view of a bending portion of the array substrate according to the first embodiment of the present invention.

Optionally, referring to FIG. 4, the bending portion 121 may also comprise the first section 1211 and the second section 1212. The first section 1211 is connected to the second section 1212, and the extending direction of the first section 1211 intersects the extending direction of the second section 1212.

Figure 5:
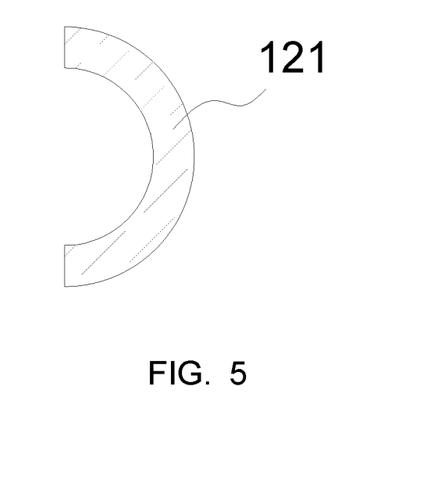
FIG. 5 is another schematic structural view of the bending portion of the array substrate according to the first embodiment of the present invention.

Optionally, please refer to FIG. 5, wherein the bending portion 121 is arc-shaped.

Of course, in the array substrate 100 of the first embodiment, a shape of the bending portion 121 is not limited to the above three structures but may be other shapes, as long as the bending portion 121 does not overlap with the edge of the color resist 14.

Please refer to FIG. 1 and FIG. 3, in the array substrate 100 of the first embodiment, the bending unit 12a comprises three bending portions 121 and two connecting portions 122. The bending portions 121 are arranged along an extending direction of the data line 12, and two adjacent bending portions 121 are connected by one of the connecting portions 122.

The number of bending portions 121 is not limited to this, but may be greater than three, and the number of corresponding connecting portions 122 also increases.

The plurality of data lines 12 comprises a first data line 12C, a second data line 12D, and a third data line 12E arranged in sequence. The first color resist 14C is disposed between the first data line 12C and the second data line 12D. The second color resist 14D is disposed between the second data line 12D and the third data line 12E. The third color resist 14E is disposed on another side of the third data line 12E.

The first color resist 14C covers one bending portion 121 of the first data line 12C. The second color resist 14D covers two bending portions 121 of the second data line 12D. The third color resist 14E covers three bending portions 121 of the third data line 12E.

Figure 6:
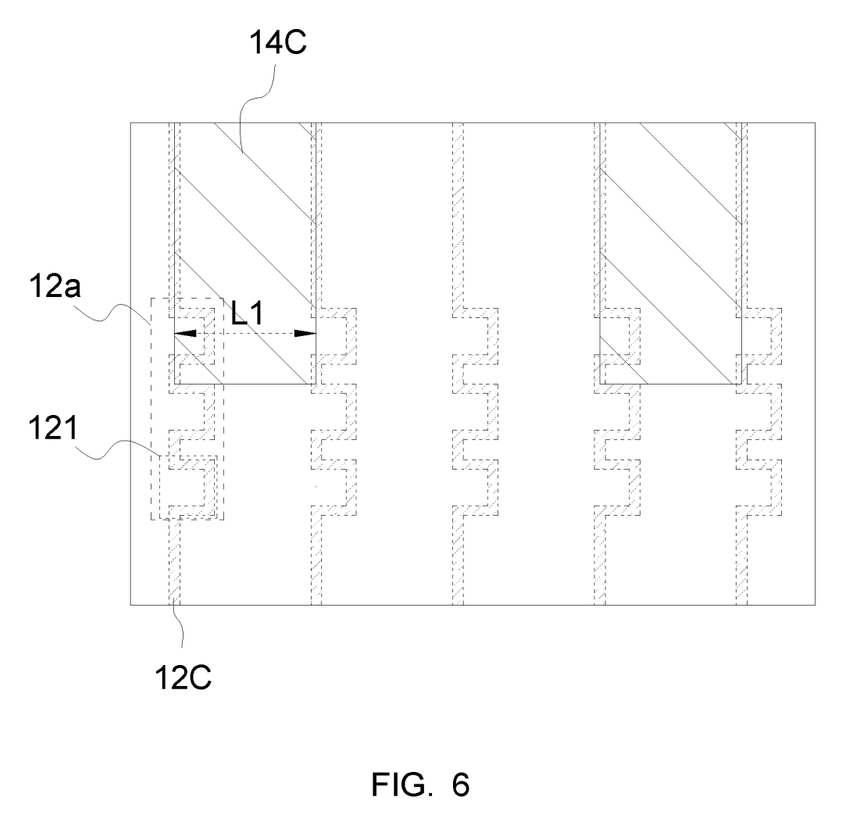
FIG. 6 is a schematic structural view of the array substrate for measuring a first color resist according to the first embodiment of the present invention.

In a process of measuring the width of the color resist 14 by the array substrate 100 of the first embodiment, please refer to FIG. 6, the first color resist 14C with a shortest length is used to cover the bending portion 121, and a width L1 of the first color resist 14C is measured by measuring edges of both sides of the portion where the first color resist 14C covers the bending portion 121.

Figure 7:
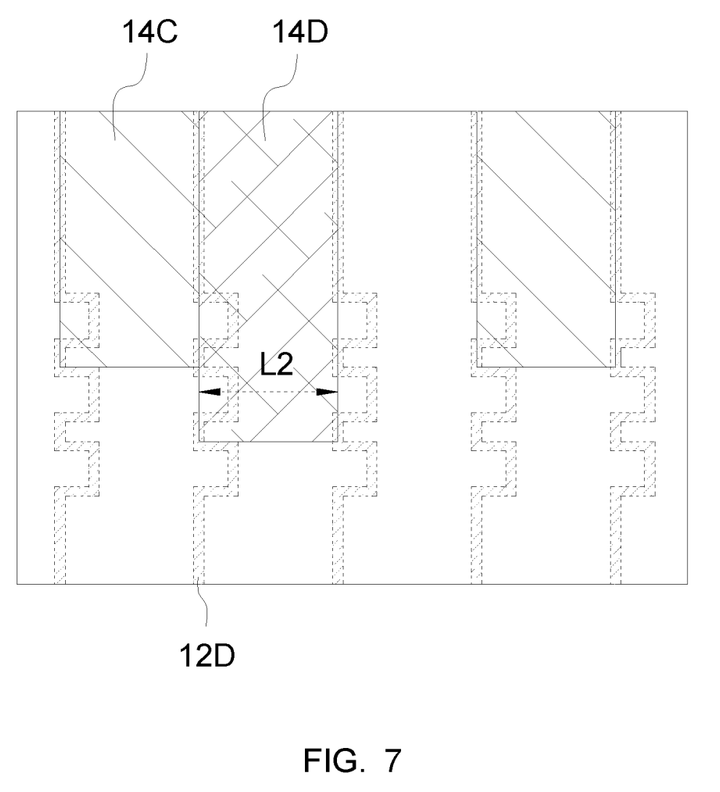
FIG. 7 is a schematic structural view of the array substrate for measuring a second color resist according to the first embodiment of the present invention.

Subsequently, referring to FIG. 7, the second color resist 14D with a longer length is used to cover the two bending portions 121, so that an end of the second color resist 14D exceeds an end of the first color resist 14C to avoid the interference of the first color resist 14C to the second color resist 14D. At the same time, the portion of the second color resist 14D that exceeds the first color resist 14C covers the bending portion 121, so that a width L2 of the second color resist 14D can be measured by measuring edges of both sides of the portion where the second color resist 14D exceeds the first color resist 14C.

Figure 8:
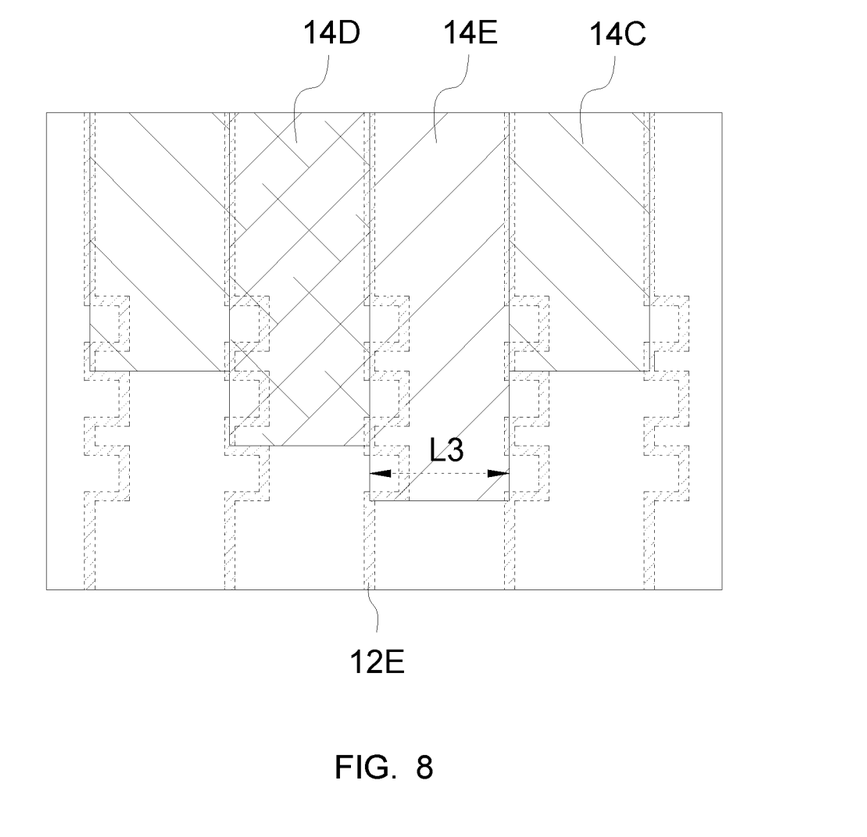
FIG. 8 is a schematic structural view of the array substrate for measuring a third color resist according to the first embodiment of the present invention.

Finally, referring to FIG. 8, the third color resist 14E with a longest length is used to cover the three bending portions 121, so that an end of the third color resist 14E exceeds an end of the second color resist 14D to avoid an interference of the second color resist 14D to the third color resist 14E. At the same time, the portion of the third color resist 14E that exceeds the second color resist 14D covers the bending portion 121, so that a width L3 of the third color resist 14E can be measured by measuring edges of both sides of the portion where the third color resist 14E exceeds the second color resist 14D.

In the array substrate 100 of the first embodiment, the first color resist 14C is a red color resist, the second color resist 14D is a green color resist, and the third color resist 14E is a blue color resist. This arrangement maximizes an area of the blue color resist, followed by an area of the green color resist, and minimizes an area of the red color resist. Furthermore, since the blue color resist per unit area has a smallest luminous brightness, the green color resist per unit area has a second highest luminous brightness, and the red color resist per unit area has a largest luminous brightness, such an arrangement improves the luminous uniformity of the three color resists 14 as a whole.

Figure 9:
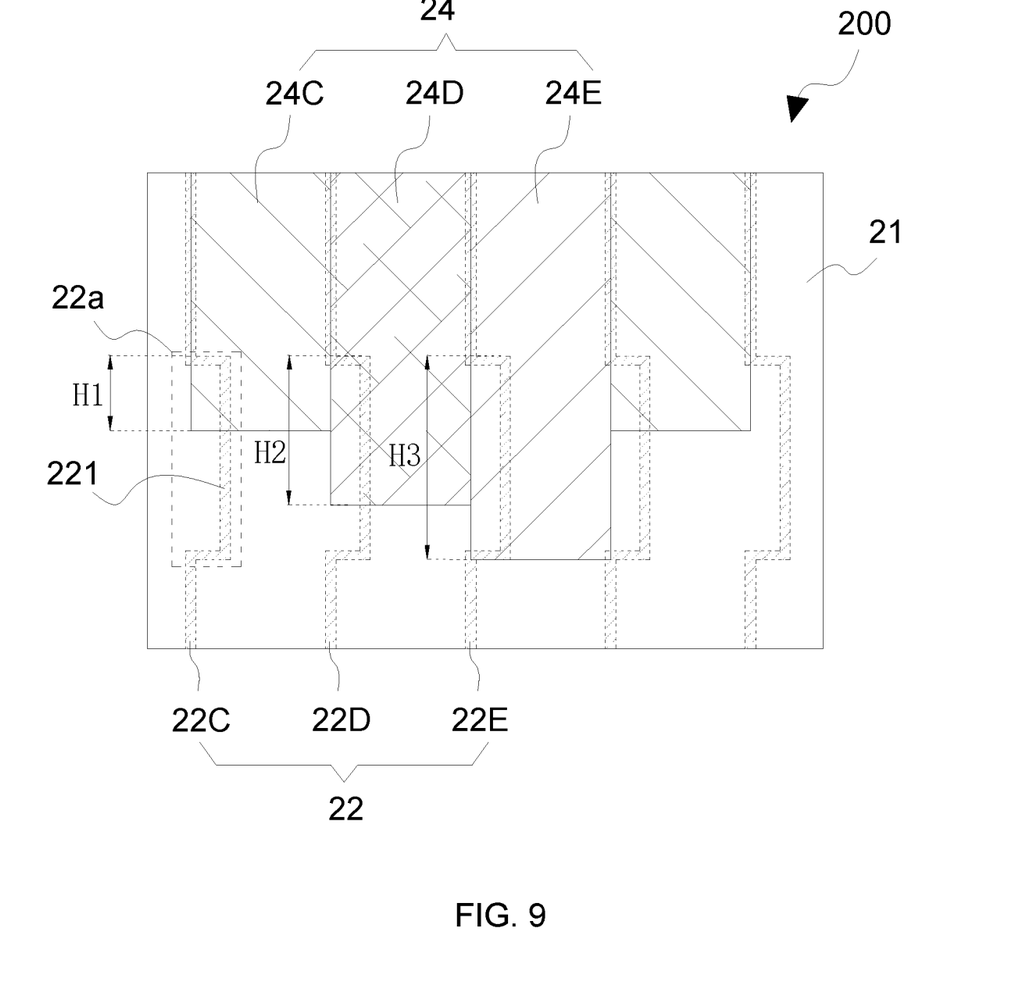
FIG. 9 is a schematic structural view of the array substrate according to a second embodiment of the present invention.

Please refer to FIG. 9. In an array substrate 200 of a second embodiment of the present invention, the array substrate 200 comprises a base substrate 21, a plurality of data lines 22, and a plurality of color resists 24. The plurality of data lines 22 comprise a first data line 22C, a second data line 22D, and a third data line 22E arranged in sequence. A first color resist 24C is disposed between the first data line 22C and the second data line 22D. A second color resist 24D is disposed between the second data line 22D and the third data line 22E. A third color resist 24E is disposed on another side of the third data line 22E.

A difference between the array substrate 200 of the second embodiment and the array substrate 100 of the first embodiment is that the bending unit 22a comprises a bending portion 221. A portion of the first color resist 24C covering the bending portion 221 of the first data line 22C has a first length H1. A portion of the second color resist 24D covering the bending portion 221 of the second data line 22D has a second length H2. A portion of the third color resist 24E covering the bending portion 221 of the third data line 22E has a third length H3.

The first length H1 is less than the second length H2, and the second length H2 is less than the third length H3.

The array substrate 200 of the second embodiment covers the different lengths of the bending portion 221 through the three color resists 24 respectively, so that ends of the three color resists 24 are offset from each other, and widths of the three color resists 24 can be measured more accurately.

A measurement process of the width of the color resist 24 by the array substrate 200 of the second embodiment is similar to or the same as that of the first embodiment. For details, please refer to the measurement process of the first embodiment.

Figure 10:
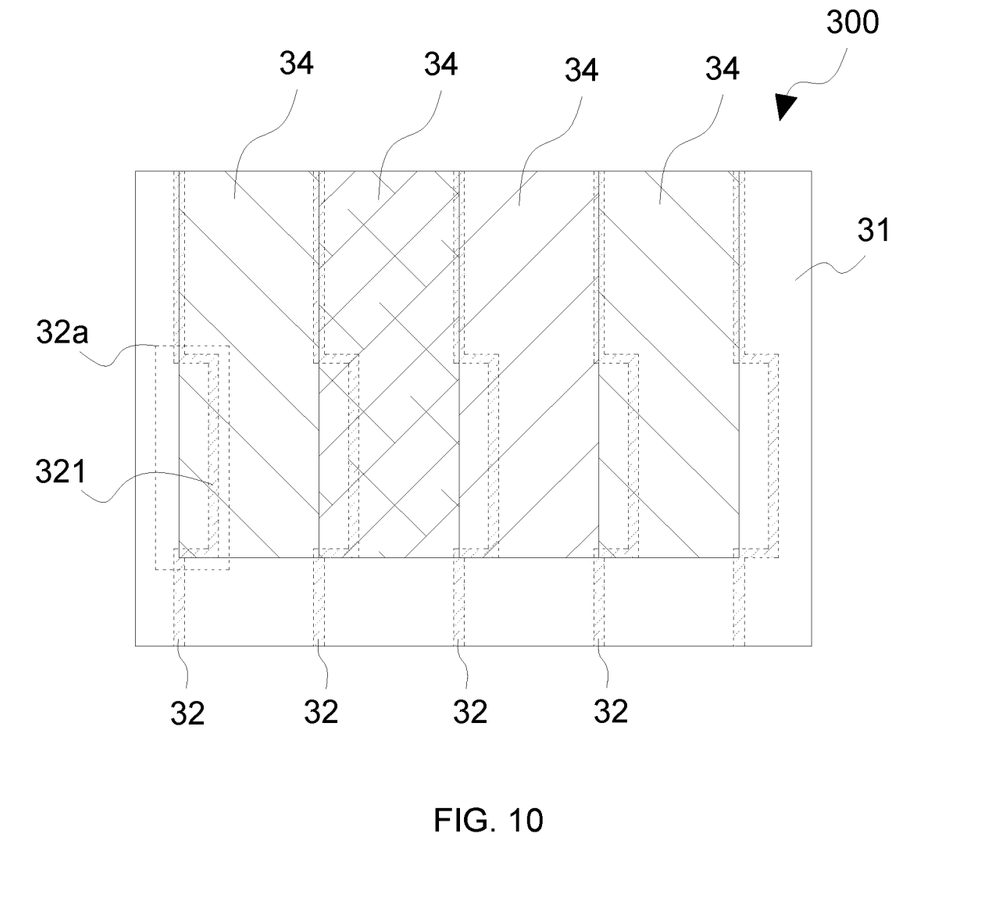
FIG. 10 is a schematic structural view of the array substrate according to a third embodiment of the present invention.

Please refer to FIG. 10, in an array substrate 300 of a third embodiment of the present invention, the array substrate 300 comprises a base substrate 31, a plurality of data lines 32, and a plurality of color resists 34.

A difference between the array substrate 300 of the third embodiment of the present invention and the array substrate 100 of the first embodiment is that the bending unit 32*a* comprises a bending portion 321, and each of the color resists 34 completely covers a bending portion 321 of the corresponding data line 32 in a one-to-one correspondence.

The present invention further relates to a display panel, which comprises one of the array substrates of all the above embodiments.

The array substrate and the display panel of the present invention are provided with the bending unit on the data line, so that the edge of the portion where the color resist covers the bending unit does not overlap with the data line, and thus it is convenient for the external device to monitor the actual width of the part of the color resist covering the bending unit.

Further, the plurality of color resists comprise the first color resist, the second color resist, and the third color resist arranged in sequence. In the embodiments of the present invention, the length of the first color resist, the length of the second color resist, and the length of the third color resist are set to increase sequentially, so as to avoid being affected by the adjacent color resist when monitoring the width of the color resist, which is conducive to monitor the width of each color resist more accurately.

The above describes the array substrate and the display panel provided by the embodiments of the present invention in detail. The article uses specific examples to explain principles and implementation of the present invention. The descriptions of the above embodiments are only used to help understand technical solutions and core ideas of the present invention. Those of ordinary skill in the art should understand that they can still modify the technical solutions described in the foregoing embodiments, or equivalently replace some of the technical features. These modifications or replacements do not deviate the essence of the corresponding technical solutions from the scope of the technical solutions of the embodiments of the present invention.

What is claimed is:

1. An array substrate, comprising:
   a base substrate;
   a plurality of data lines arranged on the base substrate at intervals, wherein each data line of the data lines comprises a bending unit comprising three bending portions and two connecting portions, and the bending portions are formed by bending the data line around a side thereof, the bending portions are arranged along an extending direction of the data lines, and two adjacent ones of the bending portions are connected by one of the connecting portions; and
   a plurality of color resists disposed over the data lines, and each of the color resists is disposed between two adjacent ones of the data lines, wherein each color resist of the color resists covers at least a portion of at least one of the bending portions, and an edge of the color resist and an edge of the bending portions covered by the color resist are not overlapped.

2. The array substrate as claimed in claim 1, wherein the plurality of color resists comprises a first color resist, a second color resist, and a third color resist disposed in sequence, a length of the first color resist is less than a length of the second color resist, and the length of the second color resist is less than a length of the third color resist.

3. The array substrate as claimed in claim 2, wherein the plurality of data lines comprises a first data line, a second data line, and a third data line arranged in sequence, the first color resist is disposed between the first data line and the second data line, the second color resist is disposed between the second data line and the third data line, and the third color resist is disposed on another side of the third data line away from the second data line; and
   the first color resist covers one bending portion of the bending portions of the first data line, the second color resist covers two bending portions of the bending portions of the second data line, and the third color resist covers all of the bending portions of the third data line.

4. An array substrate, comprising:
   a base substrate;
   a plurality of data lines arranged on the base substrate at intervals, wherein each data line of the data lines comprises a bending portion formed by bending the data line around a side thereof; and
   a plurality of color resists disposed over the data lines, and each of the color resists is disposed between two adjacent ones of the data lines, wherein each color resist of the color resists covers at least a portion of the bending portion, and an edge of the color resist and an edge of the bending portion covered by the color resist and are not overlapped; and wherein
   the plurality of color resists comprises a first color resist, a second color resist, and a third color resist disposed in sequence, a length of the first color resist is less than a length of the second color resist, and the length of the second color resist is less than a length of the third color resist;
   the plurality of data lines comprises a first data line, a second data line, and a third data line disposed in sequence, the first color resist is disposed between the first data line and the second data line, the second color resist is disposed between the second data line and the third data line, and the third color resist is disposed on another side of the third data line away from the second data line;
   a portion of the bending portion of the first data line where the first color resist covers comprises a first length, a portion of the bending portion of the second data line where the second color resist covers comprises a second length, and a portion of the bending portion of the third data line where the third color resist covers comprises a third length; and
   the first length is less than the second length, and the second length is less than the third length.

5. The array substrate as claimed in claim 1, wherein each of the bending portions comprises a first section, a second section, and a third section, the first section and the third section are disposed in parallel, one end of the second section is connected to the first section, and another end of the second section is connected to the third section.

6. The array substrate as claimed in claim 1, wherein each of the bending portions comprises a first section and a second section, the first section is connected to the second section, and an extending direction of the first section intersects with an extending direction of the second section.

7. The array substrate as claimed in claim 1, wherein each of the bending portions is arc-shaped.

8. The array substrate as claimed in claim 2, wherein the first color resist is a red color resist, the second color resist is a green color resist, and the third color resist is a blue color resist.

9. A display panel, comprising an array substrate comprising:
   a base substrate;

a plurality of data lines arranged on the base substrate at intervals, wherein each data line of the data lines comprises a bending unit comprising three bending portions and two connecting portions, and the bending portions are formed by bending the data line around a side thereof, the bending portions are arranged along an extending direction of the data lines, and two adjacent ones of the bending portions are connected by one of the connecting portions; and a plurality of color resists disposed over the data lines, and each of the color resists is disposed between two adjacent ones of the data lines, wherein each color resist of the color resists covers at least a portion of at least one of the bending portions, and an edge of the color resist and an edge of the bending portions covered by the color resist are not overlapped.

10. The display panel as claimed in claim 9, wherein the plurality of color resists comprises a first color resist, a second color resist, and a third color resist disposed in sequence, a length of the first color resist is less than a length of the second color resist, and the length of the second color resist is less than a length of the third color resist.

11. The display panel as claimed in claim 10, wherein the plurality of data lines comprises a first data line, a second data line, and a third data line arranged in sequence, the first color resist is disposed between the first data line and the second data line, the second color resist is disposed between the second data line and the third data line, and the third color resist is disposed on another side of the third data line away from the second data line; and the first color resist covers one of the bending portions of the first data line, the second color resist covers two of the bending portions of the second data line, and the third color resist covers three of the bending portions of the third data line.

12. The display panel as claimed in claim 9, wherein each of the bending portions comprises a first section, a second section, and a third section, the first section and the third section are disposed in parallel, one end of the second section is connected to the first section, and another end of the second section is connected to the third section.

13. The display panel as claimed in claim 9, wherein each of the bending portions comprises a first section and a second section, the first section is connected to the second section, and an extending direction of the first section intersects with an extending direction of the second section.

14. The display panel as claimed in claim 9, wherein each of the bending portions is arc-shaped.

15. The display panel as claimed in claim 10, wherein the first color resist is a red color resist, the second color resist is a green color resist, and the third color resist is a blue color resist.

16. The array substrate as claimed in claim 4, wherein
the bending portion comprises a first section, a second section, and a third section, the first section and the third section are disposed in parallel, one end of the second section is connected to the first section, and another end of the second section is connected to the third section.

17. The array substrate as claimed in claim 4, wherein the bending portion comprises a first section and a second section, the first section is connected to the second section, and an extending direction of the first section intersects with an extending direction of the second section.

18. The array substrate as claimed in claim 16, wherein the bending portion is arc-shaped.

19. The array substrate as claimed in claim 16, wherein the first color resist is a red color resist, the second color resist is a green color resist, and the third color resist is a blue color resist.

* * * * *